(12) United States Patent
Hejl

(10) Patent No.: US 9,794,392 B2
(45) Date of Patent: Oct. 17, 2017

(54) MOBILE-PHONE ADAPTER FOR ELECTRONIC TRANSACTIONS

(71) Applicant: Hand Held Products, Inc., Fort Mill, SC (US)

(72) Inventor: Benjamin Hejl, Cherry Hill, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 370 days.

(21) Appl. No.: 14/327,827

(22) Filed: Jul. 10, 2014

(65) Prior Publication Data

US 2016/0014251 A1 Jan. 14, 2016

(51) Int. Cl.
| | |
|---|---|
| *G06Q 20/00* | (2012.01) |
| *H04M 1/725* | (2006.01) |
| *G06Q 20/20* | (2012.01) |
| *G06Q 20/32* | (2012.01) |

(52) U.S. Cl.
CPC ........ *H04M 1/7253* (2013.01); *G06Q 20/202* (2013.01); *G06Q 20/322* (2013.01)

(58) Field of Classification Search
CPC .................................................. G06Q 20/00
USPC ................................ 705/14.36, 26.1, 44, 75
See application file for complete search history.

(56) References Cited

U.S. PATENT DOCUMENTS

| | | | |
|---|---|---|---|
| 4,302,810 A | 11/1981 | Bouricius et al. | |
| 4,575,621 A | 3/1986 | Dreifus | |
| 5,917,913 A | 6/1999 | Wang | |
| 6,069,968 A | 5/2000 | Shaw et al. | |
| 6,175,922 B1 | 1/2001 | Wang | |
| 6,282,656 B1 | 8/2001 | Wang | |
| 6,594,759 B1 | 7/2003 | Wang | |
| 6,820,199 B2 | 11/2004 | Wheeler et al. | |
| 6,832,725 B2 | 12/2004 | Gardiner et al. | |
| 6,850,916 B1 | 2/2005 | Wang | |
| 7,089,214 B2 | 8/2006 | Wang | |
| 7,124,937 B2 | 10/2006 | Myers et al. | |
| 7,128,266 B2 | 10/2006 | Marlton et al. | |
| 7,136,623 B2 | 11/2006 | Fare et al. | |
| 7,159,783 B2 | 1/2007 | Walczyk et al. | |

(Continued)

FOREIGN PATENT DOCUMENTS

| | | |
|---|---|---|
| CA | 2365644 A1 | 9/2000 |
| CA | 2403332 A1 | 9/2001 |

(Continued)

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — Rokib Masud
(74) *Attorney, Agent, or Firm* — Additon, Higgins & Pendleton, P.A.

(57) ABSTRACT

A mobile-device adapter to facilitate the exchange of visual information between a mobile device and a point-of-sale terminal is disclosed. The mobile-device adapter may be connected to a point-of-sale terminal at a retail checkout and configured to allow a customer to temporarily position their mobile device so that the mobile-device adapter may (i) image the mobile-device display and (ii) present images to the mobile-device camera. In this way, the mobile-device adapter may facilitate electronic transactions using visual images.

20 Claims, 1 Drawing Sheet

(56) References Cited

U.S. PATENT DOCUMENTS

| | | |
|---|---|---|
| 7,278,581 B2 | 10/2007 | Ong |
| 7,374,079 B2 | 5/2008 | Nam et al. |
| 7,413,127 B2 | 8/2008 | Ehrhart et al. |
| 7,635,084 B2 | 12/2009 | Wang et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2005/0165684 A1 | 7/2005 | Jensen et al. |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0184824 A1* | 7/2011 | George ............ G01D 5/39 705/24 |
| 2011/0202554 A1 | 8/2011 | Powilleit et al. |
| 2011/0251892 A1* | 10/2011 | Laracey ........ G06Q 30/0253 705/14.51 |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |

(56) References Cited

U.S. PATENT DOCUMENTS

| | | |
|---|---|---|
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0100973 A1* | 4/2014 | Brown .................. G06Q 20/34 705/17 |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |
| 2014/0291396 A1* | 10/2014 | Molisimo ............ G06K 7/1447 235/383 |

FOREIGN PATENT DOCUMENTS

| | | |
|---|---|---|
| CN | 1623173 A | 6/2005 |
| EP | 1159700 A2 | 12/2001 |
| EP | 1272933 A1 | 1/2003 |
| TW | 560159 B | 11/2003 |
| WO | 0052866 A2 | 9/2000 |
| WO | 0169388 A1 | 9/2001 |
| WO | 02069291 A2 | 9/2002 |
| WO | 03065318 A2 | 8/2003 |
| WO | 03081377 A2 | 10/2003 |
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 14/264,173 for Autofocus Lens System for Indicia Readers, filed Apr. 29, 2014, (Ackley et al.), 39 pages.

U.S. Appl. No. 14/230,322 for Focus Module and Components with Actuator, filed Mar. 31, 2014 (Feng et al.); 92 pages.

U.S. Appl. No. 14/222,994 for Method and Apparatus for Reading Optical Indicia Using a Plurality of Data, filed Mar. 24, 2014 (Smith et al.); 30 pages.

U.S. Appl. No. 14/231,898 for Hand-Mounted Indicia-Reading Device with Finger Motion Triggering, filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson);26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

(56) References Cited

OTHER PUBLICATIONS

U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control, filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination, filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion, filed Mar. 4, 2014 (Lui et al.); 25 pages.
U.S. Appl. No. 14/342,544 for Imaging Based Barcode Scanner Engine with Multiple Elements Supported on a Common Printed Circuit Board, filed Mar. 4, 2014 (Liu et al.); 27 pages.
U.S. Appl. No. 14/257,174 for Reading Apparatus Having Partial Frame Operating Mode, filed Apr. 21, 2014, (Barber et al.), 67 pages.
U.S. Appl. No. 14/200,405 for Indicia Reader for Size-Limited Applications, filed Mar. 7, 2014 (Feng et al.); 42 pages.
U.S. Appl. No. 14/166,103 for Indicia Reading Terminal Including Optical Filter, filed Jan. 28, 2014 (Lu et al.); 29 pages.

\* cited by examiner

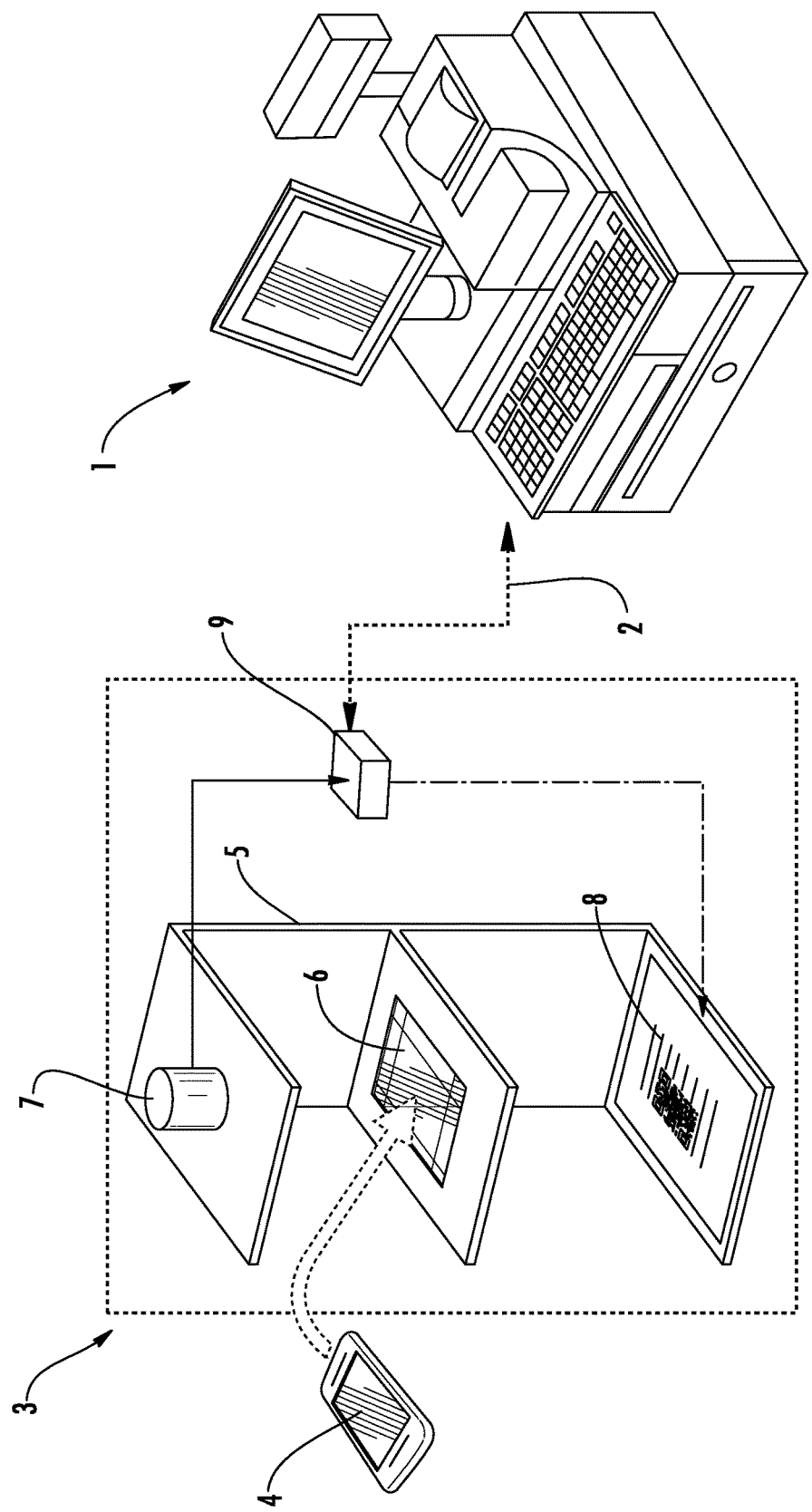

MOBILE-PHONE ADAPTER FOR ELECTRONIC TRANSACTIONS

FIELD OF THE INVENTION

The present invention relates to point-of-sale (POS) systems, and more specifically, to an apparatus for facilitating an electronic transaction with a mobile device.

BACKGROUND

Generally speaking point-of-sale (i.e., checkout) systems are computing systems that facilitate the exchange of goods/services for a payment. In general, these systems require customer payment information in order to process a cashless transaction. Traditionally, this payment information was provided by manually swiping a credit card through a magnetic reader. Recently, mobile devices (e.g., smartphones or feature phones) have begun to replace traditional credit cards for retail payments. For example, a mobile device capable of near field communication (NFC) can communicate with a point-of-sale (POS) system to exchange payment information and process the transaction. Unfortunately, a large number of customers do not use these NFC-enabled mobile devices. All mobile devices are likely, however, to be equipped with a camera and a display. These mobile devices could process a transaction with a point-of-sale terminal if there was an adapter in place that allowed the mobile device to visually communicate using its camera and display.

A need, therefore, exists for a mobile-device adapter that facilitates the exchange of visual information through the use of a mobile-device's camera and display.

SUMMARY

Accordingly, in one aspect, the present invention embraces a mobile-device adapter to facilitate electronic communication between a mobile device and a host device. The mobile-device adapter includes (i) an adapter camera, (ii) an adapter display, (iii) an adapter frame, and (iv) an adapter communication module. The adapter camera is configured to acquire images of a mobile-device display, and the adapter display is configured to present images to a mobile-device camera. The adapter frame is configured to temporarily position the mobile device. The adapter frame also permanently supports the adapter camera and the adapter display. In this way, the adapter frame permits the adapter camera to acquire images of the mobile-device display, and permits the adapter display to present images to the mobile-device camera. The adapter communication module is electrically connected to the adapter camera and the adapter display. The communication module is configured to facilitate a digital data link between the mobile-device adapter and a host device.

In another aspect, the present invention embraces a checkout system. The checkout system includes (i) a mobile device, (ii) a mobile-device adapter, and (iii) a point-of-sale terminal. The mobile device has a mobile-device camera for capturing visual information and a mobile-device display for displaying visual information. The mobile-device adapter is configured to temporarily position the mobile device and to exchange visual information with the mobile device. The mobile-device adapter includes an adapter camera for receiving visual information from the mobile-device display and an adapter display for transmitting visual information to the mobile-device camera. The point-of-sale terminal processes and records the visual information from the mobile-device adapter and is connected to the mobile-device adapter by a communication link.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 graphically depicts an exemplary checkout system including a mobile-device adapter.

DETAILED DESCRIPTION

As the number of customers using mobile devices in retail settings increases, the use of these devices for transacting purchases becomes highly desirable. Transactions using mobile devices may be enabled through the exchange of data over a wireless radio frequency (RF) link. Indeed, near field communication (NFC) has been established as a means for this wireless communication link due to its security and straightforward use. Unfortunately, many mobile devices are not equipped with NFC technology. Most, if not all, mobile devices are, however, equipped with at least one integrated camera and a display. This mobile-device camera and mobile-device display may be utilized as a means of transmitting and receiving information through visual images. In this way, mobile devices (e.g., smartphones or feature phones), not equipped with NFC, have the potential to perform the electronic communication necessary for processing a retail transaction (e.g., electronic payment).

Communicating through images (i.e., visual communication) may be accomplished using visual symbols. Barcodes, for example, are a means for transmitting information through the use of a one (or two) dimensional pattern. This pattern represents data relating to the object to which it is associated. Historically, barcodes have been read (i.e., decoded) using barcode scanners. These scanners acquire barcode information by detecting the reflected light resulting from a beam of light scanned across the light and dark areas of the barcode. More recently, these barcode scanners have been replaced with imagers that capture a visual image of the barcode and then use image processing algorithms running on a microprocessor (i.e., processor) to read (i.e., decode) the information encoded in the barcode. Indeed, applications for mobile devices exist to allow a user read a product barcode to determine price or other information.

The display of a mobile device has likewise been used for image communications. For example, the mobile-device display has been used as a means of presenting barcodes for ticketing or coupons. To redeem a coupon with a mobile device, the coupon's barcode may be displayed on the mobile device. The mobile device can then be presented, like a traditional coupon, to a checkout operator. The operator then scans the mobile-device display to redeem the coupon. Since this process may involve a customer handing the mobile device to a stranger, customers may be reluctant to adopt it as a means for transaction. Some customers feel uncomfortable letting a stranger handle their mobile device. A self-service reader, therefore, is often a preferred in this situation.

As described above, mobile devices may be used for both transmitting and receiving information visually. Combining the mobile-device imaging and display subsystems to facilitate a visual communication link with a point-of-sale terminal for the purposes of enabling a retail transaction, however, requires a novel interface (i.e., adapter). This mobile-device adapter may serve to (i) physically position the mobile device (ii) transmit/receive visual images to/from the mobile device, and (iii) communicate with a point-of-sale terminal.

An exemplary embodiment of a checkout system using a mobile-device adapter is shown in FIG. 1. In this system, a point-of-sale terminal 1 is connected via a communication link (e.g., digital-data link) 2 to a mobile-device adapter 3. The mobile-device adapter 3 allows the point-of-sale terminal 1 to interface with a mobile device 4 for the exchange of payment information (e.g., credit card information). This information may include the data necessary to process a transaction (e.g., credit card purchase). The mobile-device adapter 3 allows communication to proceed with a mobile-device camera and a mobile-device display, thereby eliminating the need for any wireless functionality (e.g., NFC communication). In general, however, functionality for both types of communication could be incorporated into the mobile-device adapter.

To use the mobile-device adapter 3, a mobile-device owner enables the mobile device 4 for a transaction and then positions the mobile device 4 in a guide area 6 formed into the mobile-device adapter frame 5. Enabling the mobile device 4 could include activating an application (i.e., app) on the mobile device 4. The application could serve to coordinate the mobile-device's camera and display for video communication. For example, the mobile-device display could present a barcode to convey transaction information, while at the same time the mobile-device's camera could be configured to collect images. Information from the collected images could then be used to update the mobile-device's display. This process of transmitting and receiving images could proceed through several iterations, and in this way, serve as a full two-way communication link.

A guide area 6 in the mobile-device adapter may be a transparent platter to help the mobile-device owner properly position the device in the mobile-device adapter 3. When the mobile device 4 is in proper position, the mobile-device display may be imaged by an adapter camera 7. Likewise, an adapter display 8 is positioned within the field of view of the mobile-device camera when the mobile device 4 is positioned in the guide area 6.

For the embodiment shown in FIG. 1, the mobile-device display and mobile-device camera are on opposite sides of the mobile device 4, however a mobile device could have both on the same side. To accommodate this, the adapter 3 could have the adapter camera 7 and the adapter display 8 on the same side. Alternatively, a different mobile-device adapter embodiment may have a reconfigurable display/camera arrangement. In addition, the adapter frame 5, shown in FIG. 1, is substantially vertical but could also be non-vertical.

The mobile-device adapter's adapter display 8, as shown in FIG. 1, presents a visual mark (i.e., symbol) representing information from the point-of-sale terminal 1 that is necessary for a transaction (e.g., checkout). For example, a symbol on the mobile-device display could identify the point-of-sale terminal. The symbol could be any mark used to encode information. Examples of possible coded symbols include: barcodes, characters for optical character recognition (OCR), or images. In addition, the symbol image could contain encrypted data within a displayed symbol or mark to add another layer of security to the communication with the mobile device.

The adapter display 8 could be a fixed mark (e.g., printed mark) or could be an electronic display (i.e., video display). When using an electronic display (e.g., video display), the visual marks could be updated or changed depending on usage and work flow. The adaptability of an electronic display could, for example, allow for a modifiable encryption for security purposes. In addition, video signals sent to the adapter display could allow for added functionality.

A video signal includes many images (i.e., image frames) sent sequentially in time. The frames are typically displayed at a frame rate that is sufficiently high so that the human eye does not perceive individual images. While this phenomenon is typically used to convey motion, it may also be used to multiplex information intended for different purposes. For example, an adapter display 8 with a high frame rate could be used to interleave transaction information frames with frames directed to the mobile-device owner (i.e., customer). These customer-directed frames might include customer information such as advertisements or customer instructions (e.g., how to use the mobile-device adapter). The transaction directed frames, on the other hand, might include (i) transaction processing payment information (e.g., credit card information or coupon information), (ii) security information (e.g., point-of-sale terminal identification), and/or (iii) timing/logic for communication. In addition, multiple frames may be used to convey a single information message. In other words, information may be distributed and displayed on different frames in a video sequence. This is especially useful to transfer a large amount of data.

The adapter camera 7 has a field of view that is directed to the mobile-device display when the mobile device 4 is positioned in the mobile-device adapter 3. In one embodiment, the mobile-device adapter 3 uses the backlight of the mobile-device's display for illumination and therefore no additional lighting is necessary.

The mobile device 4 may display a single image or may display multiple images during the transaction. In some cases, the mobile-device camera and mobile-device display may work in conjunction to transmit and receive visual information in a full two-way image communication link with the mobile-device adapter. In other embodiments the mobile-device camera might simply present a single image (e.g., coupon) for decoding (i.e., a one-way image communication link). The mobile device 4 may use a processor running algorithms to interpret (i.e., decode) a symbol displayed on the adapter display 8 in order to trigger the generation of a secure payment information image. This information may be stored on the device or may be algorithmically derived based on the transaction. A transaction may require multiple exchanges of information.

In one possible embodiment, the mobile-device adapter 3 may have electronics and processing to interpret the images acquired by the mobile-device camera 7, while in others this operation may take place remotely on a host device (e.g., point-of-sale terminal 1). For example, the functionality of a barcode reader could be incorporated with the mobile-device adapter. Here, the information sent to the point-of-sale terminal 1 would be the decoded information from the barcode. On the other hand, the mobile-device adapter may simply send raw images to the point-of-sale terminal, where the processing and decoding of the image would take place.

The data link (i.e., communication link) between the point-of-sale terminal 1 and the mobile-device adapter 3 may be wired or wireless (e.g., using radio frequency). A communication module 9 integrated as part of the mobile-device adapter 3 may process the adapter camera 7 data, add protocol information and timing, and transmit/receive data.

This module may also be electrically connected to the adapter display if the adapter display is an electronic display and can be updated.

To supplement the present disclosure, this application incorporates entirely by reference the following patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
International Publication No. 2013/163789;
International Publication No. 2013/173985;
International Publication No. 2014/019130;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193407;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0214048;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292474;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0306734;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0313326;
U.S. Patent Application Publication No. 2013/0327834;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0021256;
U.S. Patent Application Publication No. 2014/0025584;
U.S. Patent Application Publication No. 2014/0027518;
U.S. Patent Application Publication No. 2014/0034723;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0061307;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;

U.S. Patent Application Publication No. 2014/0078345;
U.S. Patent Application Publication No. 2014/0084068;
U.S. Patent Application Publication No. 2014/0086348;
U.S. Patent Application Publication No. 2014/0097249;
U.S. Patent Application Publication No. 2014/0098284;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/736,139 for an Electronic Device Enclosure, filed Jan. 8, 2013 (Chaney);
U.S. patent application Ser. No. 13/771,508 for an Optical Redirection Adapter, filed Feb. 20, 2013 (Anderson);
U.S. patent application Ser. No. 13/780,356 for a Mobile Device Having Object-Identification Interface, filed Feb. 28, 2013 (Samek et al.);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/047,896 for Terminal Having Illumination and Exposure Control filed Oct. 7, 2013 (Jovanovski et al.);
U.S. patent application Ser. No. 14/053,175 for Imaging Apparatus Having Imaging Assembly, filed Oct. 14, 2013 (Barber);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in a Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/118,400 for Indicia Decoding Device with Security Lock, filed Nov. 18, 2013 (Liu);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/222,994 for Method and Apparatus for Reading Optical Indicia Using a Plurality of Data filed Mar. 24, 2014 (Smith et al.);

U.S. patent application Ser. No. 14/230,322 for Focus Module and Components with Actuator filed Mar. 31, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/249,497 for Terminal Having Plurality of Operating Modes filed Apr. 10, 2014, Grunow et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.)

U.S. patent application Ser. No. 14/257,364 for Docking System and Method Using Near Field Communication filed Apr. 21, 2014, (Showering);

U.S. patent application Ser. No. 14/264,173 for Autofocus Lens System for Indicia Readers filed Apr. 29, 2014, (Ackley et al.);

U.S. patent application Ser. No. 14/274,858 for Mobile Printer with Optional Battery Accessory filed May 12, 2014, (Marty et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Lui et al.);

U.S. patent application Ser. No. 14/345,735 for Optical Indicia Reading Terminal with Combined Illumination filed Mar. 19, 2014 (Ouyang);

U.S. patent application Ser. No. 29/486,759 for an Imaging Terminal, filed Apr. 2, 2014 (Oberpriller et al.); and U.S. patent application Ser. No. 14/355,613 for Optical Indicia Reading Terminal with Color Image Sensor filed May 1, 2014, (Lu et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile-device adapter to facilitate electronic communication between a mobile device and a host device, the mobile-device adapter comprising:

an adapter camera configured to acquire images of a mobile-device display;

an adapter display configured to present images to a mobile-device camera;

an adapter frame configured to temporarily position the mobile device in a guide area and to permanently support the adapter camera and the adapter display, the adapter frame permitting (i) the adapter camera to acquire images of the mobile-device display and (ii) the adapter display to present images to the mobile-device camera when the mobile device is positioned in the guide area; and an adapter communication module configured to facilitate a digital data link between the mobile-device adapter and a host device, the adapter communication module being electrically connected to the adapter camera and the adapter display.

2. The mobile-device adapter according to claim 1, wherein the electronic communication between the mobile device and the host device comprises payment information.

3. The mobile-device adapter according to claim 1, wherein, the host device is a point-of-sale terminal.

4. The mobile-device adapter according to claim 1, wherein the adapter display comprises a video display configured to display a sequence of image frames comprising image frames for customer viewing and image frames for electronic communication.

5. The mobile-device adapter according to claim 4, wherein the image frames for customer viewing comprise customer instructions.

6. The mobile-device adapter according to claim 1, wherein the digital data link is a wireless communication link.

7. The mobile-device adapter according to claim 1, wherein images displayed by the adapter display comprise encrypted data.

8. The mobile-device adapter according to claim 1, wherein the images displayed by the adapter display comprise point-of-sale terminal identification information.

9. The mobile-device adapter according to claim 1, wherein the adapter display comprises a fixed mark.

10. The mobile-device adapter according to claim 1, wherein the mobile-device adapter comprises a processor configured to interpret images from the adapter camera, the processor being electrically connected to the adapter camera.

11. A checkout system, comprising:
- a mobile device having a mobile-device camera for capturing visual information and a mobile-device display for displaying visual information;
- a mobile-device adapter configured to temporarily position the mobile device in a guide area and to exchange visual information with the mobile device, the mobile-device adapter comprising (i) an adapter camera for receiving visual information from the mobile-device display and (ii) an adapter display for transmitting visual information to the mobile-device camera when the mobile device is positioned in the guide area; and
- a point-of-sale terminal for processing and recording the visual information from the mobile-device adapter, the point-of-sale terminal connected to the mobile-device adapter via a communication link.

12. The checkout system according to claim 11, wherein the visual information received by the adapter camera comprises coded symbols and the mobile-device adapter comprises a processor configured to decode the coded symbols.

13. The checkout system according to claim 11, wherein the adapter display is a printed mark.

14. The checkout system according to claim 11, wherein the adapter display is an electronic display.

15. The checkout system according to claim 14, wherein the mobile-device adapter comprises a communication module electrically connected to both the adapter camera and the adapter display, the communication module facilitating a digital data link between the mobile-device adapter and the point-of-sale terminal.

16. The checkout system according to claim 11, wherein the visual information includes payment information.

17. The checkout system according to claim 11, wherein the visual information comprises point-of-sale terminal identification.

18. The checkout system according to claim 11, wherein the visual information comprises encrypted information.

19. The checkout system according to claim 11, wherein the visual information comprises multiple images sequentially displayed.

20. The checkout system according to claim 11, wherein the point-of-sale terminal is connected to the mobile-device adapter via a wireless communication link.

* * * * *